(12) United States Patent
Masuko et al.

(10) Patent No.: US 7,172,135 B2
(45) Date of Patent: Feb. 6, 2007

(54) THERMOSTAT FOR TWO-SYSTEM COOLING DEVICE

(75) Inventors: Takashi Masuko, Tokyo (JP); Akira Mori, Tokyo (JP); Toru Yoshihara, Tokyo (JP)

(73) Assignee: Nippon Thermostat Co., Ltd., Kiyose (JP)

( * ) Notice: Subject to any disclaimer, the term of this patent is extended or adjusted under 35 U.S.C. 154(b) by 324 days.

(21) Appl. No.: 10/494,047

(22) PCT Filed: Jun. 18, 2003

(86) PCT No.: PCT/JP03/07756

§ 371 (c)(1),
(2), (4) Date: May 11, 2004

(87) PCT Pub. No.: WO2004/022942

PCT Pub. Date: Mar. 18, 2004

(65) Prior Publication Data

US 2005/0001044 A1    Jan. 6, 2005

(30) Foreign Application Priority Data

Sep. 5, 2002   (JP) .............................. 2002-259865

(51) Int. Cl.
  *G05D 23/02*    (2006.01)
  *F01P 7/14*     (2006.01)
(52) U.S. Cl. .............................. 236/101 R; 236/101 C; 236/34; 236/34.5; 123/41.09; 123/41.08
(58) Field of Classification Search .................. 236/34, 236/34.5, 101 R, 101 C, 93 R; 123/41.08, 123/41.09, 41.1; 62/196.4; 137/468
See application file for complete search history.

(56) References Cited

U.S. PATENT DOCUMENTS 4,205,784 A     6/1980  Monigold
4,621,594 A  *  11/1986 Kubis ....................... 123/41.09

FOREIGN PATENT DOCUMENTS

| JP | 56-29017 | 3/1981 |
| JP | 57-97014 | 6/1982 |
| JP | 139769/1982 | 9/1982 |
| JP | 174869/1982 | 11/1982 |
| JP | 3071546 | 5/2000 |

* cited by examiner

*Primary Examiner*—Chen Wen Jiang
(74) *Attorney, Agent, or Firm*—Oblon, Spivak, McClelland, Maier & Neustadt, P.C.

(57) ABSTRACT

A thermostat independently controlling cooling water passages of two circuits, including a first valve body having first and second passages in constant communication. A third passage is selectively connected to those passages. Communication of the third passage is disconnected when the cooling water temperature is below a prescribed temperature, and the valve is opened when the cooling water temperature is equal to or higher than the prescribed temperature. A second valve body, having fourth and fifth passages selectively in communication, closes the valve to disconnect those passages when the cooling water temperature is below the prescribed temperature, and opens the valve by operating the first valve body to link the passages when the cooling water temperature is equal to or higher than the prescribed temperature. A tubular sleeve prevents first and second control chambers, respectively including the first and second valve bodies, from communicating with each other.

17 Claims, 4 Drawing Sheets

THERMOSTAT FOR TWO-SYSTEM COOLING DEVICE

TECHNICAL FIELD

The present invention relates to a thermostat for a cooling system used for conducting flow rate control of cooling water independently in two circuits in a cooling system in which cooling water for cooling an internal combustion engine (referred to hereinbelow as an engine) used in automobiles or the like is circulated between the engine and a heat exchanger (referred to hereinbelow as a radiator).

BACKGROUND ART

In automobile engines, a cooling system of a water cooling type employing a radiator is typically used to cool the engine. In the cooling systems of this type, a thermostat using a thermally expandable body for adjusting the amount of cooling water circulating on the radiator side has been conventionally used, so that the temperature of the cooling water introduced into the engine could be controlled.

Thus, a thermostat using the aforesaid thermally expandable body is installed in part of a cooling water passage, for example, on the inlet side or outlet side of the engine, and the temperature of cooling water can be controlled to the prescribed level by closing the control valve and causing the cooling water to circulate via a bypass passage, so that it does not pass through the radiator, when the temperature of cooling water is low, and opening the control valve and circulating the cooling water via the radiator when the temperature of the cooling water becomes high.

Incidentally, it is well known that in automobile engines, a fuel consumption ratio is increased if mechanical friction of the engine is reduced. Various research and developments have been conducted to improve fuel consumption based on this well-known technology.

The increase in the wall temperature of a cylinder block is most closely related to friction reduction allowing fuel consumption to be improved, and employing independent cooling water circulation paths for a cylinder head and a cylinder block and increasing the cylinder block wall temperature, without circulating the cooling water in the cylinder block during warm-up, was confirmed to be important for accelerating the increase in the cylinder block wall temperature.

A dual-circuit cooling system in which cooling water control of the engine is conducted in the above-described two circuits makes it possible to meet such a requirement. Thus, the dual-circuit cooling system comprises independent cooling water circulation passage of the cylinder head of the engine and a cooling water circulation passage of the cylinder block, and when the temperature of cooling water is low, the circulation of cooling water is carried out only in the passage on the cylinder head side, whereas when the temperature of cooling water becomes high, the cooling water is circulated in the passages of both the cylinder head and the cylinder block.

With such a dual-circuit cooling system, the cylinder block wall temperature can be raised by reducing the flow rate of cooling water on the engine block side. Accordingly, the aforementioned effect has been conventionally obtained by using two thermostats with different temperature characteristics and conducting temperature control of cooling water passages in the two circuits.

For example, Japanese Patent Application Laid-open No. H5-215008 disclosed a cooling system for an engine, which employs the above-described thermostat for a dual-circuit cooling system, wherein two thermostats are used and the cooling water in the cooling water passages for cooling the cylinder block and the cylinder head can be controlled independently.

Japanese Patent Application Laid-open No. S57-97014 discloses a configuration in which one thermostat is used and cooling water in the passages of two circuits can be controlled.

However, in the cooling system described in Japanese Patent Application Laid-open No. H5-215008 two cooling systems for the cylinder head and the cylinder block were provided independently, and those passage systems were controlled independently. Therefore, two or more thermostats were needed or control valves had to be provided in separate locations. As a result the number of structural components was increased, the structure became complex, the cost was increased and the entire apparatus increased in size.

In the cooling system described in Japanese Patent Application Laid-open No. S57-97014, control of cooling water in the above-described two circuits was carried out by using one thermostat. Therefore, the thermostat structure was complex and the entire apparatus increased in size. In particular, in the above-described dual-circuit cooling system, cooling water systems of the two circuits had to be controlled independently and the control had to be conducted so that the temperature of the cooling water on the cylinder block side became higher than that of the cylinder head side. As a result, the structure was complex.

In particular, in the thermostat used in the above-described dual-circuit cooling system, the switching timing for connecting the passage on the above-mentioned cylinder block side is preferably operated with a shift with respect to the switching timing of the main valve in order to increase the temperature of cooling water on the cylinder block side over the temperature of cooling water on the cylinder head side. In other words, the structure is desired in which when the main valve controlling the opening and closing of the passage on the cylinder head side is closed, the subsidiary valve controlling the opening and closing of the passage on the cylinder block side is closed, and when the main valve is open, the subsidiary valve is open to match the prescribed lift of a piston rod.

Further, in a thermostat of a bottom bypass type that has been known conventionally, the first and second valves are linked so that only a transition from the open state to the close state is possible and cannot be directly used. Accordingly, taking the aforementioned issues into consideration, there is a need for providing a thermostat for a dual-circuit cooling system, this thermostat having a simple structure and allowing the desired operation state to be obtained.

With the foregoing in view, it is an object of the present invention to obtain a thermostat for a dual-circuit cooling system which allows the cooling water passages of the dual circuit to be controlled independently, makes it possible to conduct the control of cooling water in each cooling water passage at respective required timing, has a simple structure, allows the entire apparatus to be reduced in size, and is cost effective.

DISCLOSURE OF THE INVENTION

In order to attain the above-described object, one embodiment of the present invention provides a thermostat for a dual-circuit cooling system which is used in a cooling system comprising cooling water circulating passages of two independent circuits of an automobile engine, encloses a thermally expandable body which thermally expands and shrinks following changes in the temperature of cooling water and opens and closes a valve body by a piston which is moved back and forth by volume changes of the thermally expandable body, the thermostat comprising a first valve body having a first passage and a second passage which is constantly communicated with the first passage, also having a third passage that can be selectively connected to the first and second passages, maintaining a closed valve state so as to block the communication of the third passage when the temperature of cooling water is not higher than a prescribed temperature, and opens the valve when the temperature of cooling water exceeds the prescribed temperature, a second valve body having a fourth passage and a fifth passage that can be selectively communicated with this fourth passage, closing the valve so as to block the fourth and fifth passages in response to the operation of the first valve body when the temperature of cooling water is not higher than the prescribed temperature, and opening the valve in response to the operation of the first valve body when the temperature of cooling water is higher than the prescribed temperature, and a partitioning member for sealing such that a first control chamber comprising the first valve body and a second control chamber comprising the second valve body are not communicated with each other.

The thermostat for a dual-circuit cooling system in accordance with another embodiment of the present invention is the thermostat in which the partitioning member is constituted by a tubular sleeve incorporating the second valve body inside thereof.

The thermostat for a dual-circuit cooling system in accordance with another embodiment of the present invention is the thermostat in which the tubular sleeve is formed integrally with a frame holding the first valve body.

The thermostat for a dual-circuit cooling system in accordance with another embodiment of the present invention is the thermostat in which the tubular sleeve has a bell-like shape.

The thermostat for a dual-circuit cooling system in accordance with another embodiment of the present invention is the thermostat in which wherein the tubular sleeve is formed to have a shape having a through portion functioning as a holding portion for holding a piston rod mounted on a prescribed portion of a case accommodating the expandable body, so that the piston rod can slide through a prescribed length in the axial direction.

The thermostat for a dual-circuit cooling system in accordance with another embodiment of the present invention is the thermostat in which the tubular sleeve comprises a communication hole such that establishes communication between the fourth passage and the fifth passage when the second valve body slides inside and opens the valve.

The thermostat for a dual-circuit cooling system in accordance with another embodiment of the present invention is the thermostat in which the tubular sleeve comprises sealing means at the holding portion of the piston rod.

The thermostat for a dual-circuit cooling system in accordance with another embodiment of the present invention is the thermostat in which the second valve body comprises sliding means in the portion which is in sliding contact with the tubular sleeve.

In accordance with the present invention, the improvement of the conventional structure of the thermostat in which a bypass valve provided on the bottom side closes a passage according to the lift of the main valve makes it possible to obtain a configuration in which the second valve body for open-close control of the passage on the cylinder block side closes when the first valve body for open-close control on the cylinder head side is closed, and the second valve body is open according to the prescribed amount of lift of the piston rod when the first valve body side is open. Further, the control of cooling water in the cooling water passages of the two circuits is conducted at respective prescribed timing.

Further, in accordance with the present invention, the first control chamber and the second control chamber are partitioned so that they are not communicated with each other and the cooling water passages of the two circuits can be controlled independently. Therefore, cooling water at different temperatures can be caused to flow in the passages and a contribution is made to a rapid warm-up of the engine head. Therefore, in the dual-system cooling system, the flow rate of cooling water into the dual circuits can be controlled accurately and in a simple manner, the number of structural components can be decreased, the size of the entire apparatus can be reduced, and the cost can be decreased.

In accordance with the present invention, using a tubular sleeve as the partitioning member and providing the second valve body slidably inside thereof prevents direct contact of the second valve body with the case enclosing the sleeve, thereby eliminating a risk of wear or scratching of the valve body.

Therefore, the casing portion where the thermostat is mounted can be substituted, for example, with an engine block and the so-called built-in structure can be employed. Furthermore, with the thermostat in accordance with the present invention, the thermostat unit allows for modularization and can be replaced independently of the casing side for the engine block or the like. Therefore, maintenance or repair can be conducted in a simple manner and the maintenance cost can be reduced.

Further, the present invention also provides a structure in which misalignment is prevented because the partitioning member portion such as a tubular sleeve having the second valve body is disposed in a state in which it is held on the casing side separately from the frame portion provided with the first valve body.

In addition, in accordance with the present invention, the period in which the first valve body is open and the period in which the second valve body is open can be shifted at any timing by changing appropriately the length of the piston rod or the second valve body in the axial direction and varying the open-close timing with the tubular sleeve. As a result, control of cooling water in the two circuits can be easily adjusted so as to be conducted at the prescribed timing, thereby allowing a variety of requirements to be met.

Further, in accordance with the present invention, fusing rubber or the like, as means for sliding against the tubular sleeve, to the outer peripheral portion of the second valve body improves slidability of the second valve body and sealing properties of the sliding portion. As a result, cooling water control in the second valve body can be carried out even more accurately.

BEST MODE FOR CARRYING OUT THE INVENTION

Figure 1:
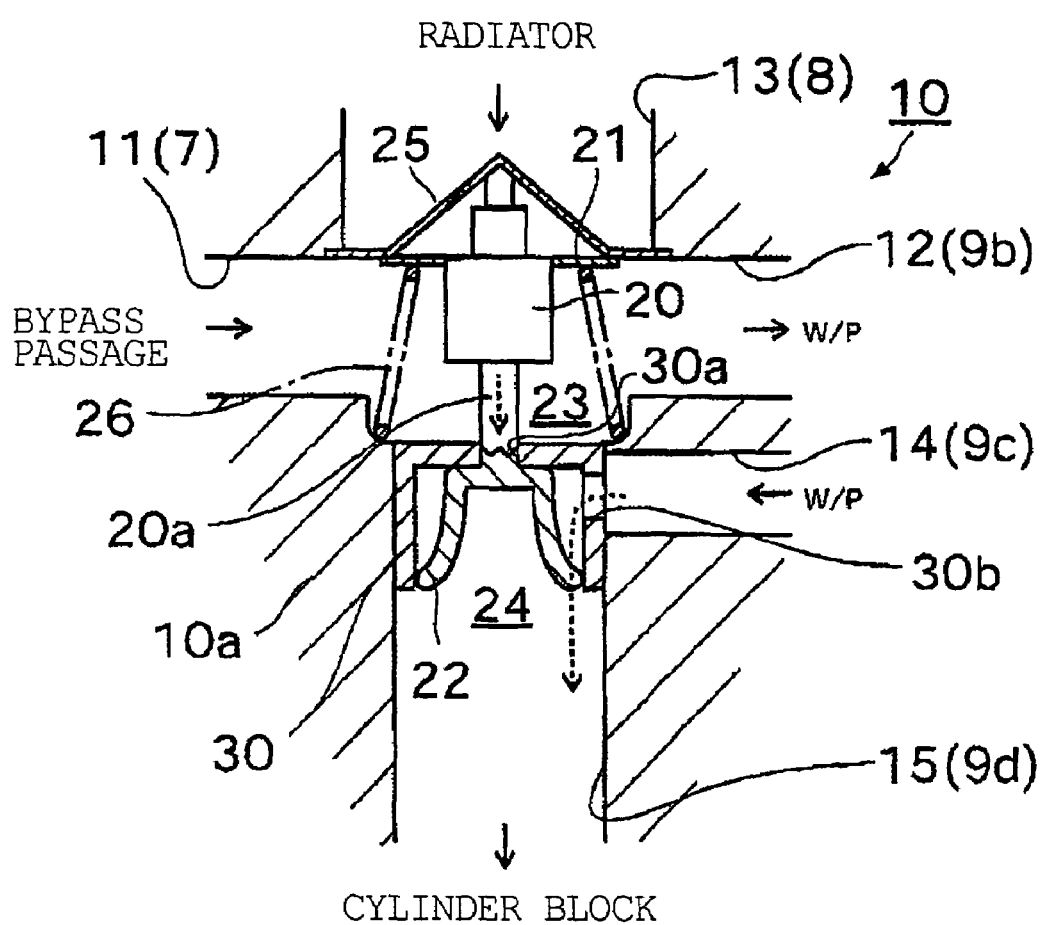
FIG. 1 is an enlarged cross-sectional view illustrating an embodiment of a thermostat for a dual-circuit cooling system in accordance with the present invention.
Figure 2:
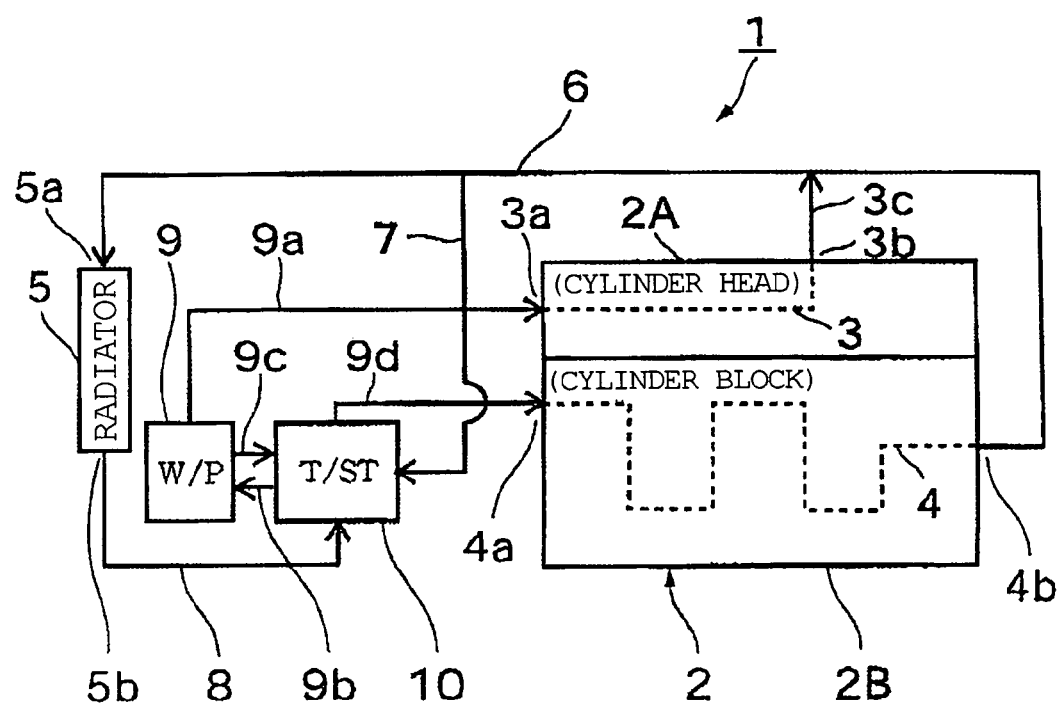
FIG. 2. is a schematic structural drawing for explaining the main features of the entire dual-circuit cooling system employing the thermostat for a dual-circuit cooling system in accordance with the present invention.

FIG. 1 and FIG. 2 illustrate an embodiment of the thermostat for a dual-circuit cooling system in accordance with the present invention. Of those figures, first, the main features of a dual-circuit cooling system 1 comprising a thermostat 10 in accordance with the present invention will be explained hereinbelow with reference to FIG. 2.

In FIG. 2, the reference numeral 2 stands for an automotive engine as an internal combustion engine composed of a cylinder head 2A and a cylinder block 2B. Respective independent cooling water passages 3, 4 are formed in the cylinder head 2A and the cylinder block 2B of the engine 2.

The reference numeral 5 stands for a heat exchanger, that is, a radiator. A cooling water inlet portion 5a and a cooling water outlet portion 5b of the radiator 5 are connected by a cooling water circuit for circulating the cooling water in the cooling water passages 3, 4 in the cylinder head 2A and cylinder block 2B of the engine 2.

This cooling water circuit comprises a cooling water passage 6 on the outflow side, which leads from an outlet portion 4b of cooling water provided in the cylinder block 2B of the engine 2 to the inlet portion 5a of the radiator 2. A passage 3c from the cooling water outlet portion 3b provided in the cylinder head 2A is connected to the cooling water passage 6, and flows of the cooling water merge at the outlet side and are supplied to the radiator 5.

A bypass passage 7 is branched from a location downstream of the flow merging portion of passage 3c in the cooling water passage 6. This bypass passage 7 is connected to a thermostat 10 for regulating the flow rate of cooling water into the cooling water passages 3, 4 of the cylinder head 2A and cylinder block 2B.

A cooling water passage 8 on the inflow side is connected to the outlet portion 5b of the radiator 5, and this passage 8 is connected to the thermostat 10.

A cooling water circulation path for cooling the cylinder head 2A and cylinder block 2B of the engine 2 are formed by those engine 2, radiator 5, and cooling water passages 6, 8.

The reference numeral 9 stands for a water pump (W/P) for forcibly circulating the cooling water in the aforesaid cooling water circulation path. The water pump is connected to the thermostat 10 via the cooling water passage 9b and connected to the inlet portion 3a of the cooling water passage 3 in the cylinder head 2A via the cooling water passage 9a. Furthermore, the water pump 9 is connected to the inlet portion 4a of the cooling water passage 5 in the cylinder block 2B via the cooling water passage 9c, thermostat 10, and cooling water passage 9d.

Cooling water supplied from the radiator 5 to the thermostat 10 via the cooling water passage 8 on the inflow side or cooling water supplied via the bypass passage 7 is appropriately and independently supplied to the cooling water passage 3 in the cylinder head 2A and the cooling water passage 4 in the cylinder block 2B via the cooling water passages 9a, 9b, 9c, and 9d, while being controlled by the operation of the thermostat 10.

The above-mentioned water pump 9 is composed so that the rotary shaft thereof is rotationally driven, for example, by rotation of a crankshaft (not shown in the figure) of the engine 2, and causes forcible circulation of cooling water in the cooling water circuit.

Further, a cooling fan unit (not shown in the figure) for forcibly supplying cooling air is installed on the radiator 5.

FIG. 1 shows the configuration of the thermostat 10 serving a temperature-sensitive automatic valve used in a dual-circuit cooling system 1 composed of independent cooling water passage 3 located inside the cylinder head 2A and the cooling water passage 4 located inside the cylinder block 2B of the automotive engine and serving to control the flow rate of cooling water to those cooling water passages 3, 4 in the afore-described configuration.

Thus, the thermostat comprises inside a housing 10a, which serves as a casing, a first valve body 21 having a first passage 11, a second passage 12 constantly communicated with the first passage 11, and a third passage 13 that can be selectively connected to those first and second passages 11, 12, maintaining a closed valve state so as to block the communication of the third passage 13 when the cooling water temperature is not higher than a prescribed temperature (when the temperature is low), and opening the valve in response to the lift of a piston 20b (upwards as seen in the figure) from the thermostat body 20 when the cooling water temperature exceeds the prescribed temperature (when the temperature is high), and a second valve body 22 which has a fourth passage 14 and a fifth passage 15 selectively communicated with the fourth passage 14, and which closes the valve so as to block those passages 14, 15 when the cooling water temperature is not higher than the prescribed temperature and opens the valve in response to the lift of the piston rod 20a so as to link the passages when the cooling water temperature is above the prescribed temperature.

Further, a tubular sleeve 30 having a through portion 30a for passing the piston rod 20a that actuates the second valve body 22 is provided, this sleeve also serving as a partitioning member for conducting sealing such that a first control chamber 23 having the aforementioned first valve body 21 and a second control chamber 24 having the aforementioned second valve body 22 are not communicated with each other.

Here the aforesaid first passage 11 is a portion communicated with the passage into which the cooling water flows via the bypass passage 7 in the cooling water circuit shown in FIG. 2, and the second passage 12 is a portion equivalent to the passage 9b leading from the thermostat 10 to the water pump 9. Further, the third passage 13 is a portion communicated with the cooling water passage 8 from the radiator 5.

On the other hand, the fourth passage 14 is equivalent to the passage 9c leading from the water pump 9 to the thermostat 10, and the fifth passage 15 is equivalent to the passage 9d leading from the cylinder block 2B to the cooling water passage 4.

The tubular sleeve 30 as a whole has an almost bell-like shape and is provided so as to separate the portions equivalent to the first control chamber 23 and second control chamber 24 in the housing 10a. Here, a through portion 30a functioning as a holding portion for holding the piston rod 20a so that it is free to slide therein is provided in the center of the upper end portion of the tubular sleeve 30. Holding means for holding the piston rod so that it is free to slide and sealing means (details thereof are not shown in the figure) for ensuring sealing in this portion are provided in this through portion 30a and ensure partitioning such that the aforementioned control chambers 23, 24 are not communicated with each other.

Further, a communication hole 30*b* is formed in the side part of the tubular sleeve 30 so as to establish communication with the fourth passage 14 which is open outside thereof.

Furthermore, the second valve body slidably operating inside the tubular sleeve 30 has an approximately lap-like shape, as shown in FIG. 1, and the outer edge of the lower end portion thereof is in sliding contact with the inner peripheral surface of the sleeve 30. If the second valve body 22 moves through an appropriate stroke downward, as shown in the figure, it moves downward from the lower end of the sleeve 30, and the gap which is opened by this movement provides for a supply of cooling water from the fourth passage 14 to the fifth passage 15.

Here, sliding means such as rubber may be fused to the portion of the aforesaid second valve body 22 which slides against the sleeve 30. As a result, sliding contact between the metals is eliminated and excellent sliding and sealing properties are obtained.

In the above-described structure, the fourth passage 14 and fifth passage 15 may be disposed inversely.

The thermostat body 20 of thermostat 10 has a conventional well-known structure in which the first and second valve bodies 21, 22 are opened and closed, thereby causing the cooling water to flow, by providing a wax element or the like and using expansion and contraction of the wax which is sensitive to the temperature of cooling water.

Further, in the figure, the reference numeral 25 stands for a frame for protecting part of the body 20 of the thermostat 10, and 26—a valve spring for impelling the first valve 21 in the closing direction. Here, when the frame 25 has a shape with a holding portion for holding the valve spring 26, the aforementioned tubular sleeve 30 may be provided integrally therewith; such a configuration is not shown in FIG. 1. In this case, the entire thermostat 10 is composed as a single unit, insertion thereof into the housing 10*a* can be conducted in an easy manner, and the number of parts can be reduced. Furthermore, when the second valve body 22 or other parts have to be replaced or when maintenance is required, the entire unit can be easily removed from the housing 10*a*.

With the dual-circuit cooling system 1 comprising the thermostat 10 having the above-described configuration, when the temperature is low, the main valve formed by the first valve body 21 is closed, cooling water from the cylinder head 2A of the engine is supplied from the passage 9*b* into the water pump 9 via the passage 6, bypass passage 7, and first control chamber 23 of the thermostat 10. Then, it is supplied by the water pump 9 form the passage 9*a* into the cooling water passage 3 located in the cylinder head 2A.

If from this state the cooling water assumes a certain constant temperature, the wax element or the like located inside the thermostat body 20 expands, the first valve body 21 opens, the cooling water from the radiator 5 flows into the first control chamber 23 created by the first and second passages 11, 12, and the amount of cooling water is increased. At this time, similarly to the first valve body 21, the second valve body 22 is also lifted downward and opens in the prescribed position. As a result, the cooling water also flows from the water pump 9 into the cooling water passage 4 of the cylinder block 2B via the passages 9*c*, 9*d*.

At this time, because the open-close timing of the second valve body 22 can be set according to the amount of lift of the piston rod 20*a*, the open-close timing can be set to the desired timing, the temperature increase in the cylinder block 2B can be appropriately adjusted, the temperature of cylinder block wall can be increased, and fuel consumption can be improved.

Figure 3:
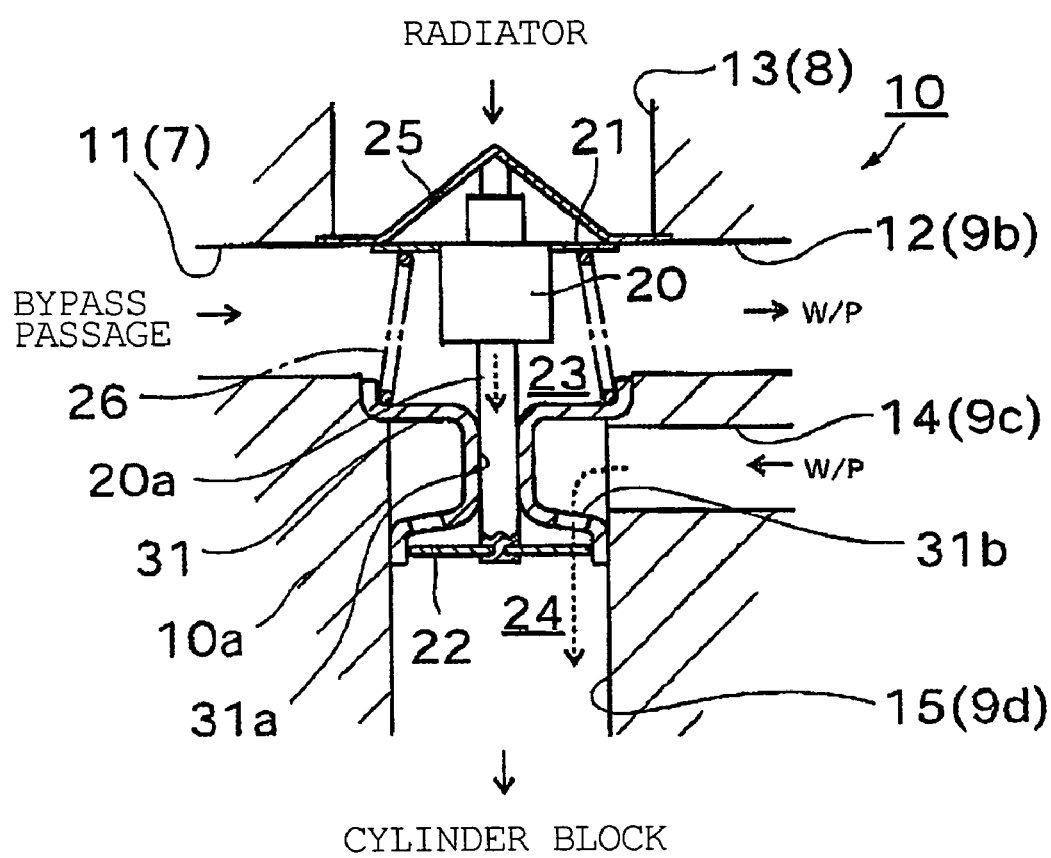
FIG. 3 is a schematic structural drawing illustrating another embodiment of the thermostat for a dual-circuit cooling system in accordance with the present invention.
Figure 4:
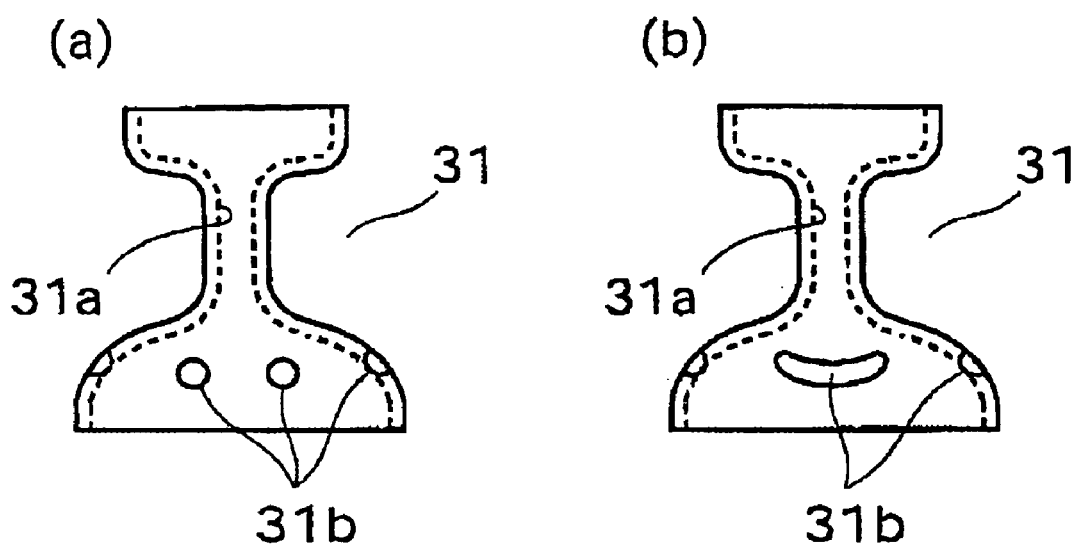
FIG. 4(a), (b) are side views of a sleeve in the thermostat shown in FIG. 3.

FIG. 3 and FIG. 4 illustrate another embodiment of the present invention. In this embodiment, as shown in FIG. 3, the shape of the tubular sleeve 31 serving as a partitioning member is modified.

Thus, the tubular sleeve 31 is formed, for example, by drawing and has a shape with a through portion 31*a* functioning as a holding portion for holding the piston rod 20*a* so that it is free to slide over the prescribed length in the axial direction. This through portion 31*a* functioning as a holding portion over the prescribed length in the axial direction has a function of a misalignment-preventing portion that prevents the misalignment of the piston rod 20*a* or the second valve body 22 (here a flat plate valve body is shown as an example). Sliding means or a sealing material are appropriately provided in the through portion 31*a* in the same manner as in the above-described embodiment.

Further, a small hole shown in FIG. 4(*a*) or a long groove shown in FIG. 4(*b*) serve as examples of the through hole 31*b* in the tubular sleeve 31.

It goes without saying that sliding means such as rubber may be attached to the outer peripheral edge of the second valve body 22 (this means is not shown in the figure).

The present invention is no limited to the configurations explained in the above-described embodiments, and the shape and structure of components of the dual-circuit cooling system 1 or the thermostat 10 used therein can be appropriately changed and modified.

Furthermore, the arrangement position of the water pump 9 or the like in the cooling system shown in FIG. 2 can be freely changed appropriately, and the layout of the passages in various parts obviously can be also freely changed.

INDUSTRIAL APPLICABILITY

As described hereinabove, with the thermostat for a dual-circuit cooling system in accordance with the present invention, the conventional structure of the thermostat in which a bypass valve provided on the bottom side closes the passage according to the lift of the main valve is improved, and a configuration is provided such that when the first valve body for open-close controlling the passages on the cylinder head side is closed, the second valve body for open-close controlling the passages on the cylinder block side is closed, and when the first valve body is open, the second valve body is opened following the prescribed lift of the piston rod. Therefore, the control of the cooling water in the cooling water passage passages of the two circuits can be conducted in the prescribed state at the respective required timing.

Furthermore, in accordance with the present invention, the first control chamber and the second control chamber are partitioned so that they are not communicated with each other, and the cooling water passages of the two systems are controlled independently. Therefore, cooling water at different temperatures can be passed in each passage and a contribution can be made to the rapid warm-up of the engine head. Therefore, in the dual-circuit cooling system, the flow rate control of cooling water into the two circuits can be conducted accurately and in an easy manner with a single thermostat, the number of structural components can be reduced, the size of the entire apparatus can be decreased, and cost can be reduced. Furthermore, the thermostat can be used for controlling a plurality of independent cooling water paths. For example, it can be used in cooling water passages of a heater and an engine block or in cooling water paths of two separate blocks of the V-type engine.

Furthermore, in accordance with the present invention, a tubular sleeve is used as a partitioning member, and the second valve body is slidably provided inside thereof. As a result, the direct contact of the second valve body with the casing enclosing the sleeve is prevented, there is no risk of the valve body being worn or scratched, and reliability of operations can be ensured. Moreover, this means that the casing portion where the thermostat is to be mounted can be replaced with the engine, that is, the so-called built-in structure can be employed. The thermostat in accordance with the present invention also has other advantages. Thus, because it can be modularized and replaced independently of the casing such as an engine block, the thermostat can be handled and assembled in a simple manner, maintenance and repair thereof can be easily conducted, and it is effective in terms of maintenance cost.

Further, in accordance with the present invention, the thermostat can be also installed in a state in which it is held on the casing side with a portion of a partitioning member such as a tubular sleeve having a second valve body, separately from the frame portion where the first valve body is provided. Therefore, a structure with high resistance to misalignment is obtained and excellent reliability of operation is obtained.

Moreover, in accordance with the present invention, the timing at which the first valve body opens the valve and the timing at which the second valve body opens the valve can be shifted to any timing by changing appropriately the length of the piston rod or the second valve body in the axial direction and changing the open-close timing with the tubular sleeve. Therefore, control of cooling water in the two circuits can be easily adjusted so as to be conducted at any timing in each circuit and various requirements can be met.

Another advantage of the present invention is that if rubber or the like is fused on the outer periphery of the second valve body to serve as means for improving sliding with respect to the tubular sleeve, then sliding properties of the second valve body and sealing of the sliding portion are improved. Therefore, cooling water control in the second valve body can be conducted with even higher accuracy.

The invention claimed is:

1. A thermostat for a dual-circuit cooling system used in a cooling system comprising cooling water circulating passages of two independent circuits of an automobile engine, and a thermally expandable body which thermally expands and shrinks following changes in the temperature of cooling water and which opens and closes a valve body by a piston which is moved back and forth by volume changes of said thermally expandable body, said thermostat comprising:
  a first valve body having a first passage, a second passage which is constantly communicated with the first passage, and a third passage that is selectively connected to said first and second passages, said first valve body being configured to maintain a closed valve state so as to disconnect the communication of the third passage when the temperature of cooling water is not higher than a prescribed temperature and configured to open when the temperature of cooling water exceeds said prescribed temperature;
  a second valve body having a fourth passage and a fifth passage that is selectively communicated with the fourth passage, said second valve body being configured to close so as to disconnect said fourth and fifth passages in response to the operation of the first valve body when the temperature of cooling water is not higher than the prescribed temperature, and configured to open in response to the operation of the first valve body when the temperature of cooling water is equal to or higher than the prescribed temperature; and
  a partitioning member sealing a first control chamber comprising said first valve body and a second control chamber comprising said second valve body such that said first control chamber and said second control chamber are not communicated with each other,
  wherein said partitioning member comprises a tubular sleeve incorporating the second valve body inside thereof.

2. The thermostat for a dual-circuit cooling system according to claim 1, wherein said tubular sleeve is formed integrally with a frame holding said first valve body.

3. The thermostat for a dual-circuit cooling system according to claim 1, wherein said tubular sleeve has a bell-like shape.

4. The thermostat for a dual-circuit cooling system according to claim 3, wherein said tubular sleeve comprises a communication hole which establishes communication between the fourth passage and the fifth passage when the second valve body slides inside and opens.

5. The thermostat for a dual-circuit cooling system according to claim 1, wherein said tubular sleeve is formed to have a shape having a through portion functioning as a holding portion for holding a piston rod mounted on a prescribed portion of a case accommodating said expandable body, so that the piston rod can slide through a prescribed length in the axial direction.

6. The thermostat for a dual-circuit cooling system according to claim 5, wherein said tubular sleeve comprises a communication hole which establishes communication between the fourth passage and the fifth passage when the second valve body slides inside and opens.

7. The thermostat for a dual-circuit cooling system according to claim 1, wherein said tubular sleeve comprises sealing means at the holding portion which holds said piston rod.

8. The thermostat for a dual-circuit cooling system according to claim 1, wherein said second valve body comprises sliding means in the portion which is in sliding contact with the tubular sleeve.

9. A thermostat for a dual-circuit cooling system having a housing having a first control chamber and a second control chamber, comprising:
  a thermally expandable body which thermally expands and shrinks following changes in a temperature of cooling water;
  a piston rod configured to move back and forth due to volume changes of said thermally expandable body;
  a first valve body provided in the first control chamber and connected to said piston rod, said first valve body being configured to maintain a first passage and a second passage constantly communicated, open the communication to a third passage when the temperature of cooling water exceeds a prescribed temperature, and close the communication to the third passage when the temperature of cooling water is not higher than the prescribed temperature;
  a second valve body provided in the second control chamber and connected to said piston rod, said second valve being configured to open the communication between a fourth passage and a fifth passage in response to the operation of the first valve body when the temperature of cooling water is equal to or higher than the prescribed temperature and close the communication between the fourth passage and the fifth passage in response to the operation of the first valve body when the temperature of cooling water is not higher than the prescribed temperature; and a partitioning member sealing the first control chamber and the second control chamber such that the first control chamber and the second control chamber are not communicated with each other, said partitioning member comprising a tubular sleeve in which the second valve body is positioned inside thereof.

10. The thermostat for a dual-circuit cooling system according to claim 9, further comprising a valve spring which impels the first valve body to close the communication to the third passage.

11. The thermostat for a dual-circuit cooling system according to claim 9, wherein said tubular sleeve is formed integrally with a frame holding said first valve body.

12. The thermostat for a dual-circuit cooling system according to claim 9, wherein said tubular sleeve has a bell-like shape.

13. The thermostat for a dual-circuit cooling system according to claim 12, wherein said tubular sleeve comprises a communication hole which establishes the communication between the fourth passage and the fifth passage when said second valve body slides inside and opens the communication between the fourth passage and the fifth passage.

14. The thermostat for a dual-circuit cooling system according to claim 9, wherein said tubular sleeve has a through portion which holds said piston rod mounted on a portion of a case accommodating said expandable body such that said piston rod slides through a prescribed length in the axial direction.

15. The thermostat for a dual-circuit cooling system according to claim 9, wherein said tubular sleeve comprises a sealing member positioned in said through portion.

16. The thermostat for a dual-circuit cooling system according to claim 9, wherein said second valve body comprises a sliding member which is in sliding contact with said tubular sleeve.

17. A thermostat for a dual-circuit cooling system having a housing having a first control chamber and a second control chamber, comprising:

a thermally expandable body which thermally expands and shrinks following changes in a temperature of cooling water;

a piston rod configured to move back and forth due to volume changes of said thermally expandable body;

first valve means for maintaining a first passage and a second passage constantly communicated, opening the communication to a third passage when the temperature of cooling water exceeds a prescribed temperature, and closing the communication to the third passage when the temperature of cooling water is not higher than the prescribed temperature;

second valve means for opening the communication between a fourth passage and a fifth passage in response to the operation of the first valve body when the temperature of cooling water is equal to or higher than the prescribed temperature and closing the communication between the fourth passage and the fifth passage in response to the operation of the first valve body when the temperature of cooling water is not higher than the prescribed temperature; and a partitioning member sealing the first control chamber and the second control chamber such that the first control chamber and the second control chamber are not communicated with each other, said partitioning member comprising a tubular sleeve in which the second valve means is positioned inside thereof, wherein said first and second valve means operates in response to movement of said piston rod.

* * * * *